(12) United States Patent
Kaga et al.

(10) Patent No.: US 11,205,525 B2
(45) Date of Patent: Dec. 21, 2021

(54) INSULATED WIRE

(71) Applicant: Hitachi Metals, Ltd., Tokyo (JP)

(72) Inventors: Masafumi Kaga, Tokyo (JP); Tamotsu Kibe, Tokyo (JP)

(73) Assignee: Hitachi Metals, Ltd., Tokyo (JP)

(*) Notice: Subject to any disclaimer, the term of this patent is extended or adjusted under 35 U.S.C. 154(b) by 0 days.

(21) Appl. No.: 16/174,996

(22) Filed: Oct. 30, 2018

(65) Prior Publication Data

US 2019/0139671 A1 May 9, 2019

(30) Foreign Application Priority Data

Nov. 7, 2017 (JP) .............................. JP2017-214346

(51) Int. Cl.
*H01B 3/28* (2006.01)
*H01B 7/295* (2006.01)
(Continued)

(52) U.S. Cl.
CPC ............ *H01B 3/28* (2013.01); *C08L 23/0853* (2013.01); *H01B 3/442* (2013.01); *H01B 7/295* (2013.01);
(Continued)

(58) Field of Classification Search
CPC .......... C09J 201/00; H05B 3/56; H05B 3/146; H05B 3/16; H05B 3/565; H01B 1/24; H01B 7/0054; H01C 7/027; H05K 3/321
See application file for complete search history.

(56) References Cited

U.S. PATENT DOCUMENTS

| 2,437,708 A * | 3/1948 | Plass | H01B 9/027 |
| | | | 174/102 SC |
| 2,446,387 A * | 8/1948 | Peterson | H01B 9/02 |
| | | | 174/105 SC |

(Continued)

FOREIGN PATENT DOCUMENTS

| JP | 5-47225 A | 2/1993 |
| JP | 05166418 A * | 7/1993 |

(Continued)

OTHER PUBLICATIONS

Japanese-language Office Action issued in counterpart Japanese Application No. 2017-214558 dated Nov. 20, 2018 (four (4) pages).
(Continued)

*Primary Examiner* — Krystal Robinson
(74) *Attorney, Agent, or Firm* — Crowell & Moring LLP

(57) ABSTRACT

An insulated wire having an electrical wire structure capable of reducing an outer diameter while an insulation property and a flame-retardant property are highly kept is provided. In the insulated wire including: a conductor; and a coating layer arranged on an outer periphery of the conductor, the coating layer includes: a semiconductive layer having a volume resistivity defined by JIS C2151 that is equal to or smaller than $1.0\times10^{15}$ (Ωcm); an insulating layer arranged on an outer periphery of the semiconductive layer, the insulating layer having a volume resistivity defined by JIS C2151 that is larger than $5.0\times10^{15}$ (Ωcm); and a flame-retardant semiconductive layer arranged on an outer periphery of the insulating layer, the flame-retardant semiconductive layer having a volume resistivity defined by JIS C2151 that is equal to or smaller than $1.5\times10^{15}$ (Ωcm) and having an oxygen index defined by JIS K7201-2 that is larger than 40.

11 Claims, 2 Drawing Sheets

(51) Int. Cl.
*H01B 3/44* (2006.01)
*C08L 23/08* (2006.01)
*C08K 3/016* (2018.01)
*C08K 3/22* (2006.01)

(52) U.S. Cl.
CPC ...... *C08K 3/016* (2018.01); *C08K 2003/2224* (2013.01)

(56) References Cited

U.S. PATENT DOCUMENTS

| | | | | |
|---|---|---|---|---|
| 2,721,154 A * | 10/1955 | Hopf | ............ | B05D 5/12 |
| | | | | 427/122 |
| 2,913,515 A * | 11/1959 | Ebel | ............ | H01B 9/027 |
| | | | | 174/102 R |
| 3,178,384 A * | 4/1965 | Sutherland | ............ | H01B 7/28 |
| | | | | 524/563 |
| 3,424,631 A * | 1/1969 | Peacock | ............ | H01B 9/02 |
| | | | | 156/51 |
| 3,479,446 A * | 11/1969 | Arnaudin, Jr. | ............ | H01B 13/22 |
| | | | | 174/120 R |
| 3,632,720 A * | 1/1972 | Mildner | ............ | H01B 7/29 |
| | | | | 264/171.18 |
| 3,793,716 A * | 2/1974 | Smith-Johannsen | ............ | H05B 3/16 |
| | | | | 29/611 |
| 3,849,192 A * | 11/1974 | Schmidt | ............ | B29C 48/911 |
| | | | | 427/117 |
| 3,861,029 A * | 1/1975 | Smith-Johannsen | ............ | H01C 7/027 |
| | | | | 29/611 |
| 4,029,830 A * | 6/1977 | Yamamoto | ............ | H01B 7/0275 |
| | | | | 427/487 |
| 4,124,747 A * | 11/1978 | Murer | ............ | H01B 1/24 |
| | | | | 429/210 |
| 4,150,193 A * | 4/1979 | Burns, Jr. | ............ | H01B 1/24 |
| | | | | 174/102 SC |
| 4,187,389 A * | 2/1980 | Foote | ............ | H02G 15/068 |
| | | | | 156/53 |
| 4,312,383 A * | 1/1982 | Kleykamp | ............ | B29C 65/3612 |
| | | | | 138/103 |
| 4,488,125 A * | 12/1984 | Gentry | ............ | H01B 7/0823 |
| | | | | 174/115 |
| 4,554,173 A | 11/1985 | Fujimura et al. | | |
| 4,650,972 A * | 3/1987 | Cunningham | ............ | H05B 3/56 |
| | | | | 219/549 |
| 4,769,179 A * | 9/1988 | Kato | ............ | C08K 3/22 |
| | | | | 252/609 |
| 5,001,304 A | 3/1991 | Hardin et al. | | |
| 5,063,125 A * | 11/1991 | Yuh | ............ | G03G 5/047 |
| | | | | 430/58.75 |
| 5,106,538 A * | 4/1992 | Barma | ............ | C08K 3/0033 |
| | | | | 252/503 |
| 5,260,848 A * | 11/1993 | Childers | ............ | H01C 7/105 |
| | | | | 338/21 |
| 5,358,786 A | 10/1994 | Ishikawa et al. | | |
| 5,459,041 A | 10/1995 | Blaser et al. | | |
| 6,034,162 A | 3/2000 | Mizutani et al. | | |
| 6,359,230 B1 | 3/2002 | Hildreth | | |
| 6,755,995 B1 * | 6/2004 | Hasegawa | ............ | C08K 3/22 |
| | | | | 106/18.11 |
| 8,287,770 B2 * | 10/2012 | Easter | ............ | C08K 3/04 |
| | | | | 252/511 |
| 8,946,557 B2 | 2/2015 | Fukuda et al. | | |
| 9,443,645 B2 | 9/2016 | Iwasaki et al. | | |
| 9,514,860 B2 * | 12/2016 | Kikuchi | ............ | H01B 3/46 |
| 2001/0009198 A1 * | 7/2001 | Belli | ............ | H01B 3/441 |
| | | | | 174/110 R |
| 2003/0141097 A1 * | 7/2003 | Belli | ............ | H01B 7/295 |
| | | | | 174/110 R |
| 2003/0164483 A1 * | 9/2003 | Scelza | ............ | C08K 3/34 |
| | | | | 252/601 |
| 2004/0149483 A1 | 8/2004 | Glew | | |
| 2005/0045368 A1 * | 3/2005 | Keogh | ............ | H01B 7/295 |
| | | | | 174/120 R |
| 2006/0096777 A1 | 5/2006 | Glew | | |
| 2006/0246286 A1 * | 11/2006 | Easter | ............ | H01B 3/34 |
| | | | | 428/375 |
| 2007/0010615 A1 * | 1/2007 | Cogen | ............ | H01B 3/441 |
| | | | | 524/515 |
| 2008/0311328 A1 | 12/2008 | Kimura | | |
| 2008/0317990 A1 | 12/2008 | Runyan et al. | | |
| 2009/0200059 A1 * | 8/2009 | Cinquemani | ............ | H01B 9/025 |
| | | | | 174/113 R |
| 2010/0163269 A1 * | 7/2010 | Perego | ............ | H01B 3/441 |
| | | | | 174/107 |
| 2011/0111153 A1 | 5/2011 | Russell et al. | | |
| 2011/0172367 A1 | 7/2011 | Backer et al. | | |
| 2011/0198105 A1 | 8/2011 | Shanai et al. | | |
| 2012/0037394 A1 * | 2/2012 | Kojima | ............ | H01B 3/004 |
| | | | | 174/34 |
| 2012/0227997 A1 * | 9/2012 | Koelblin | ............ | H01B 7/2813 |
| | | | | 174/102 SC |
| 2013/0092416 A1 * | 4/2013 | Saito | ............ | H01B 9/027 |
| | | | | 174/120 SC |
| 2013/0228358 A1 | 9/2013 | Fujimoto et al. | | |
| 2014/0011028 A1 | 1/2014 | Iwasaki et al. | | |
| 2014/0030520 A1 | 1/2014 | Nakamura et al. | | |
| 2014/0083738 A1 | 3/2014 | Segawa et al. | | |
| 2014/0166339 A1 * | 6/2014 | Bates | ............ | H01B 7/295 |
| | | | | 174/120 R |
| 2014/0182883 A1 | 7/2014 | Sugita et al. | | |
| 2014/0370315 A1 * | 12/2014 | Iwasaki | ............ | C08K 3/22 |
| | | | | 428/516 |
| 2015/0034359 A1 | 2/2015 | Sugita et al. | | |
| 2015/0371735 A1 | 12/2015 | Iwasaki et al. | | |
| 2016/0049221 A1 | 2/2016 | Lee et al. | | |
| 2016/0125973 A1 | 5/2016 | Iwasaki et al. | | |
| 2016/0148724 A1 | 5/2016 | Kikuchi et al. | | |
| 2017/0032867 A1 | 2/2017 | Iwasaki et al. | | |
| 2017/0365373 A1 | 12/2017 | Hirano et al. | | |
| 2017/0365378 A1 | 12/2017 | Kaga et al. | | |
| 2018/0033522 A1 * | 2/2018 | Blair | ............ | H01B 7/0225 |
| 2020/0407531 A1 * | 12/2020 | Rosenfeld | ............ | D06N 3/14 |

FOREIGN PATENT DOCUMENTS

| | | |
|---|---|---|
| JP | 6-52728 A | 2/1994 |
| JP | 2001-347559 A | 12/2001 |
| JP | 2007-168500 A | 7/2007 |
| JP | 2011-228189 | 11/2011 |
| JP | 2014-11140 A | 1/2014 |
| JP | 2014-225478 | 12/2014 |
| JP | 2015-74730 A | 4/2015 |
| JP | 2015-118857 A | 6/2015 |
| JP | 2017-27878 A | 2/2017 |
| KR | 10-0855795 B1 | 9/2008 |

OTHER PUBLICATIONS

Japanese-language Office Action issued in counterpart Japanese Application No. 2017-214346 dated Nov. 22, 2018 (three (3) pages).
Japanese-language Office Action issued in counterpart Japanese Application No. 2017-214559 dated Nov. 20, 2018 (three (3) pages).
U.S. Appl. No. 16/175,019, filed Oct. 30, 2018.
U.S. Appl. No. 16/175,127, filed Oct. 30, 2018.
Non-Final U.S. Office Action issued in U.S. Appl. No. 16/175,127 dated Dec. 10, 2019 (24 pages).
Final U.S. Office Action issued in U.S. Appl. No. 16/175,019 dated Nov. 27, 2019 (11 pages).
Japanese-language Office Action issued in counterpart Japanese Application No. 2017-214559 dated Feb. 5, 2019 with English translation (seven (7) pages).
Japanese-language Office Action issued in counterpart Japanese Application No. 2017-214558 dated Feb. 5, 2019 with English translation (seven (7) pages).
Japanese-language Office Action issued in counterpart Japanese Application No. 2017-214346 dated Feb. 1, 2019 with English translation (six (6) pages).

(56) References Cited

OTHER PUBLICATIONS

"Common Test Methods for Cables Under Fire Conditions-Test for Vertical Flame Spread of Vertically-Mounted Bunched Wires or Cables", British Standard, EN 50266-2-4:2001 (14 pages).
"Railway Applications-Railway Rolling Stock Cables Having Special Fire Performance-Test Methods", British Standard, EN 50305:2002 (42 pages).
"Testing Methods of Plastic Films for Electrical Purposes" JIS C2151, Aug. 20, 2006, Japanese Standards Association, with partial English translation (57 pages).
"Plastics-Determination of Burning Behavior by Oxygen Index— Part 2: Ambient-Temperature Test", JIS K7201-2, Mar. 20, 2007, Japanese Standards Association, with partial English translation (40 pages).
Non-final U.S. Office Action issued in U.S. Appl. No. 16/175,019 dated May 16, 2019 (42 pages).
U.S. Non-Final Office Action issued in U.S. Appl. No. 16/175,019 dated Mar. 18, 2020 (13 pages).
Japanese-language Office Action issued in Japanese Application No. 2017-214558 dated Mar. 26, 2020 with English translation (12 pages).
Japanese-language Office Action issued in Japanese Application No. 2017-214346 dated Mar. 26, 2020 with English translation (nine (9) pages).
Japanese-language Office Action issued in Japanese Application No. 2017-214559 dated Mar. 26, 2020 with English translation (12 pages).

\* cited by examiner

INSULATED WIRE

CROSS-REFERENCE TO RELATED APPLICATION

The present application claims priority from Japanese Patent Application No. 2017-214346 filed on Nov. 7, 2017, the content of which is hereby incorporated by reference into this application.

TECHNICAL FIELD OF THE INVENTION

The present invention relates to an insulated wire.

BACKGROUND OF THE INVENTION

Insulated wires, which are used as wiring in railroad cars and automobiles, are required to have not only the insulation property but also such a flame-retardant property as making the wires difficult to burn at the time of fire. For this reason, a flame retardant is contained in a coating layer of the insulated wire. For example, Japanese Patent Application Laid-Open Publication No. 2014-11140 (Patent Document 1) discloses an insulated wire having a coating layer formed by stacking a flame-retardant layer containing a flame retardant on an outer periphery of an insulating layer having an insulation property. According to the Patent Document 1, the insulation property and the flame-retardant property can be well balanced at a high level.

SUMMARY OF THE INVENTION

Meanwhile, in recent years, reducing an outer diameter of the insulated wire has been required for a purpose of reducing a weight of the insulated wire. Therefore, reducing thicknesses of an inner-positioned insulating layer and an outer-positioned flame-retardant layer has been studied.

Accordingly, an object of the present invention is to provide an insulated wire having a wire structure in which the outer diameter of the wire can be reduced while the insulation property and the flame-retardant property are kept high.

The present invention provides the following insulated wires.

[1] The insulated wire includes: a conductor; and a coating layer arranged on an outer periphery of the conductor. In the insulated wire, the coating layer includes: a semiconductive layer having a volume resistivity that is equal to or smaller than $1.5 \times 10^{15}$ (Ωcm) defined by JIS C2151; an insulating layer on an outer periphery of the semiconductive layer, the insulating layer having a volume resistivity that is larger than $5.0 \times 10^{15}$ (Ωcm); and a flame-retardant semiconductive layer on an outer periphery of the insulating layer, the flame-retardant semiconductive layer having a volume resistivity that is equal to or smaller than $1.5 \times 10^{15}$ (Ωcm) and having an oxygen index that is larger than 40 defined by JIS K7201-2.

[2] In the insulated wire described in the aspect [1], the insulated wire has a flame-retardant property that allows the insulated wire to pass a vertical tray flame test (VTFT) on the basis of EN 50266-2-4.

[3] In the insulated wire described in the aspect [1] or [2], the insulated wire has a direct-current stability that allows the insulated wire to pass a direct-current stability test in conformity to EN 50305.6.7.

[4] In the insulated wire described in any one of aspects [1] to [3], a diameter of the conductor is equal to or smaller than 1.25 mm, and a thickness of the coating layer is smaller than 0.6 mm.

[5] In the insulated wire described in any one of aspects [1] to [4], breaking elongation of the coating layer measured in a tensile test with a tension rate of 200 m/min is equal to or larger than 150%.

[6] In the insulated wire described in any one of aspects [1] to [5], a flame-retardant resin composition making up the flame-retardant semiconductive layer includes at least one resin selected from a group consisting of high-density polyethylene, linear low-density polyethylene, low-density polyethylene, ethylene-(α-olefin) copolymer, ethylene-vinyl acetate copolymer, ethylene-acrylic acid ester copolymer, and ethylene-propylene-diene copolymer.

[7] In the insulated wire described in any one of aspects [1] to [6], a flame-retardant semiconductive resin composition making up the flame-retardant semiconductive layer contains a resin component and a flame retardant so that 150 or more and 250 or less parts by mass of the flame retardant per 100 parts by mass of the resin component is contained.

[8] In the insulated wire described in any one of aspects [1] to [7], an insulating resin composition making up the insulating layer contains a resin component so that the resin component is made of high-density polyethylene and/or low-density polyethylene.

According to the present invention, an insulated wire having a wire structure in which the outer diameter of the wire is reduced while the insulation property and the flame-retardant property are kept can be provided.

BRIEF DESCRIPTIONS OF THE DRAWINGS

DESCRIPTIONS OF THE PREFERRED EMBODIMENTS

Figure 3:
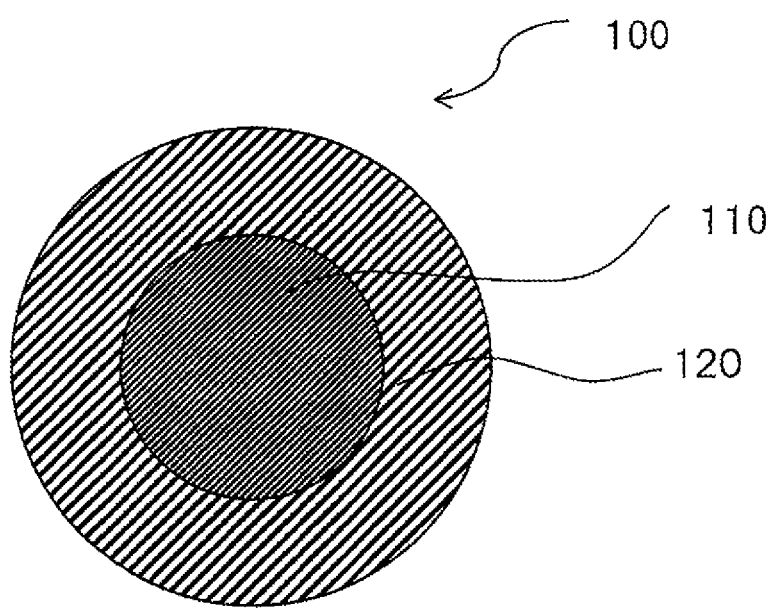
FIG. 3 is a horizontal cross-sectional view showing a related-art insulated wire.

First, the related-art insulated wire will be described with reference to FIG. 3. FIG. 3 is a cross-sectional view of the related-art insulated wire that is vertical to a longitudinal direction. As shown in FIG. 3, a related-art insulated wire 100 includes a conductor 110, an insulating/flame-retardant layer 120 that is single layer arranged on an outer periphery of the conductor 110.

In the related-art insulated wire 100, it is required to achieve both the electrical insulation property and the flame-retardant property by using single material in the insulating/flame-retardant layer 120. A large amount of inorganic fillers are added in order to ensure the flame-retardant property of the material making up the insulating/flame-retardant layer 120, so that an oxygen index can be made equal to or larger than 40. However, the electrical insulation property is decreased by the influence of the inorganic fillers, and therefore, the insulated wire fails the direct-current stability test in conformity to EN 50305.6.7 that is an index of the insulation property.

Accordingly, in order to improve the insulation property, the present inventors have considered an insulated wire having a structure in which an inner semiconductive layer, an insulating layer and an outer semiconductive layer are formed in this order from the conductor side. Each of the inner semiconductive layer and the outer semiconductive layer is made of a conductive resin composition to which a conductive filler has been added. The conductor generally has a strand structure of strand wires, and has surface irregularity because strand joints appear on the surface of the conductor (such surface irregularity may be referred to as "conductor surface irregularity" below). The inner semiconductive layer contributes to flattening of the surface irregularity as a layer cancelling the conductor surface irregularity, so that the electric field concentration can be suppressed, and the insulation property can be improved. Similarly, the outer semiconductive layer also flattens the fine surface irregularity on the surface of the insulating layer caused during the extrusion, and protects the insulating layer from being scratched during the extrusion, so that the insulation property can be improved.

However, in this insulated wire, while the insulation property was improved, the flame-retardant property was decreased because the conductive resin compositions of the inner semiconductive layer and the outer semiconductive layer are combustible materials, and therefore, the insulated wire failed the vertical tray flame test (VTFT) in conformity to EN50266-2-4 that is the index of the flame-retardant property.

Accordingly, in order to solve the problem in the flame-retardant property, the present inventors have considered that the flame-retardant semiconductive layer is formed by replacing the conductive filler in the conductive resin composition making up the outer semiconductive layer with the flame-retardant filler to provide the flame-retardant property so as to obtain an insulated wire having a semiconductive layer, an insulating layer and a flame-retardant semiconductive layer arranged on the outer periphery of the conductor.

However, by the provision of the flame-retardant property to the outer semiconductive layer, the conductive property decreased, and therefore, it was required to increase the thickness of the flame-retardant semiconductive layer in order to obtain the favorable conductive property.

Figure 1:
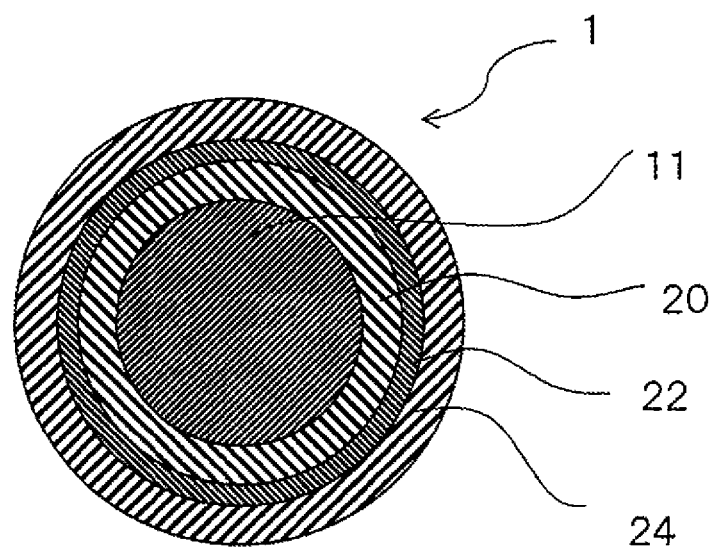
FIG. 1 is a horizontal cross-sectional view showing an embodiment of an insulated wire of the present invention.

Accordingly, based on the structure of the insulated wire, the present inventors invented an insulated wire 1 shown in FIG. 1 that is formed by extremely thinning the insulating layer 22 so that the volume resistivity of the insulating resin composition making up the insulating layer 22 is equal to or larger than $5.0 \times 10^{15}$ ($\Omega$cm).

According to this insulated wire 1, the volume resistivity of the insulating layer 22 is maintained at the high value, so that the conductive property of the flame-retardant semiconductive layer 24 can be relatively ensured. From this fact, the following effects appear.

When the insulating layer 22 is arranged on the outer periphery of the conductor 11, the insulating layer 22 is easy to be damaged due to the electric field concentration caused by the surface irregularity of the conductor 11, and therefore, it is difficult to thin the insulating layer 22. The semiconductive layer 20 is arranged on the outer periphery of the conductor 11 to cover the surface of the conductor 11, so that the semiconductive layer 20 can be functioned as the electric field moderating layer. As a result, the insulating layer 22 arranged on the semiconductive layer 20 can be thinned.

In this manner, the insulating layer 22 that is the combustible material can be thinned. As a result, the flame-retardant semiconductive layer 24 can be thinned. From these facts, the insulated wire that achieves flame-retardant property, the direct-current stability and the diameter reduction can be provided. When a plurality of the insulated wires that achieved the diameter reduction as described above are bundled together and used as a wire harness, such a further effect as a reduction in the weight of the wire harness is caused.

From the above-described findings, the present inventors have found that the insulated wire capable of ensuring the direct-current stability while achieving the flame-retardant property and the diameter reduction can be provided by providing the volume resistivity of the semiconductive layer 20 defined by JIS C2151 to be equal to or smaller than $1.0 \times 10^{15}$ ($\Omega$cm), providing the volume resistivity of the insulating layer 22 defined by JIS C2151 to be larger than $5.0 \times 10^{15}$ ($\Omega$cm), providing the volume resistivity of the flame-retardant semiconductive layer 24 defined by JIS C2151 to be equal to or smaller than $1.5 \times 10^{15}$ ($\Omega$cm), and providing the oxygen index defined by JIS K7201-2 to be larger than 40.

In the present specification, note that "the diameter reduction" means that the outer diameter of the insulated wire is reduced by thinning the coating layer of the insulated wire so as to be thinner than that of the related-art insulated wire (Table 1—General data—Cable type 0.6/1 kV unsheathed of EN 50264-3-1 (2008)) having the same conductor diameter. Specifically, when the conductor diameter is equal to or smaller than 1.25 mm, the thickness of the coasting layer of the insulated wire can be smaller than 0.60 mm. When the conductor diameter is larger than 1.25 mm and equal to or smaller than 5.00 mm, the thickness of the coasting layer of the insulated wire can be smaller than 0.70 mm. When the conductor diameter is larger than 5.00 mm and equal to or smaller than 7.70 mm, the thickness of the coasting layer of the insulated wire can be smaller than 0.90 mm. When the conductor diameter is larger than 7.7 mm and equal to or smaller than 9.20 mm, the thickness of the coasting layer of the insulated wire can be smaller than 1.00 mm. When the conductor diameter is larger than 9.20 mm and equal to or smaller than 12.50 mm, the thickness of the coasting layer of the insulated wire can be smaller than 1.10 mm. When the conductor diameter is larger than 12.50 mm and equal to or smaller than 14.20 mm, the thickness of the coasting layer of the insulated wire can be smaller than 1.20 mm. When the conductor diameter is larger than 14.20 mm and equal to or smaller than 15.80 mm, the thickness of the coasting layer of the insulated wire can be smaller than 1.40 mm. When the conductor diameter is larger than 15.80 mm and equal to or smaller than 17.50 mm, the thickness of the coasting layer of the insulated wire can be smaller than 1.60 mm. When the conductor diameter is larger than 17.50 mm and equal to or smaller than 20.10 mm, the thickness of the coasting layer of the insulated wire can be smaller than 1.70 mm. When the conductor diameter is larger than 20.10 mm and equal to or smaller than 22.50 mm, the thickness of the coasting layer of the insulated wire can be smaller than 1.80 mm. When the conductor diameter is larger than 22.50 mm and equal to or smaller than 25.80 mm, the thickness of the coasting layer of the insulated wire can be smaller than 2.00 mm.

In addition, a mechanical strength has been evaluated on the basis of the standard EN 50264, 60811-1-2, and the breaking elongation can be equal to or larger than 150%.

The present invention has been made on the basis of the above-described findings.

<Configuration of Insulated Wire>

Hereinafter, an insulated wire according to an embodiment of the present invention will be described with reference to to drawings. FIG. 1 is a cross-sectional view that is vertical to a longitudinal direction of the insulated wire according to the embodiment of the present invention.

As shown in FIG. 1, the insulated wire 1 according to the present embodiment includes a conductor 11, a semiconductive layer 20, an insulating layer 22, and a flame-retardant semiconductive layer 24. According to the present embodiment, the insulating layer 22 is arranged on an outer periphery of the semiconductive layer 20, and the flame-retardant semiconductive layer 24 is arranged on an outer periphery of the insulating layer 22. In other words, the coating layer is formed by stacking three layers that are the semiconductive layer 20, the insulating layer 22, and the flame-retardant semiconductive layer 24 in this order from the conductor 11 side.

(Conductor)

As the conductor 11, not only a normally-used metal wire such as a copper wire or a copper alloy wire but also an aluminum wire, a gold wire, and a silver wire can be used. A metal wire whose outer periphery is metal-plated with tin, nickel or others may be used. Further, a bunch stranded conductor formed by strand metal wires can be also used. A cross-sectional area and an outer diameter of the conductor 11 can be properly changed in accordance with the electrical characteristics required for the insulated wire 1. For example, the cross-sectional area is exemplified to be equal to or larger than 1 mm$^2$ and equal to or smaller than 10 mm$^2$, and the outer diameter is exemplified to be equal to or larger than 1.20 mm and equal to or smaller than 2.30 mm.

(Semiconductive Layer)

The semiconductive layer 20 may be extruded and formed onto the outer periphery of the conductor 11 so that the volume resistivity is equal to or smaller than $1.0 \times 10^{25}$ (Ωcm), and a semiconductive resin composition is used. In the present embodiment, the electric field concentration can be suppressed by using the semiconductive layer 20 to flatten the surface irregularity of the conductor, the electric field strength on the insulating layer 22 is reduced, and the insulating property is improved. In addition, since the semiconductive layer 20 is covered with the insulating layer 22, the water infiltration into the semiconductive layer 20 is suppressed when the insulated wire 1 is immersed into saltwater solution to evaluate its direct-current stability, and therefore, the first flame-retardant layer 20 has the high insulation reliability, and also contributes to the direct-current stability of the coating layer. That is, in the semiconductive layer 20, the direct-current stability can be improved.

While the volume resistivity of the semiconductive layer 20 is not particularly limited as long as being equal to or smaller than $1.0 \times 10^{25}$ (Ωcm), the smaller is more preferable from the viewpoint of the conductivity. Note that the volume resistivity is an index of the insulation property in the present specification, and is defined by the standard JIS C2151 in the present embodiment.

The semiconductive resin composition making up the semiconductive layer 20 contains a resin component and a conductive agent, and is formed so as to have the volume resistivity that is equal to or smaller than $1.0 \times 10^{15}$ (Ωcm). The semiconductive layer 20 is formed by, for example, extruding the semiconductive resin composition onto the outer periphery of the conductor 11.

As the resin component used for the semiconductive resin composition, for example, a polyolefin resin or others is cited. As the polyolefin resin, for example, a polyethylene-based resin or others can be used. As the polyethylene-based resin, for example, polyethylene such as low-density polyethylene (LDPE), linear low-density polyethylene (LLDPE) and high-density polyethylene (HDPE), ethylene-vinyl acetate copolymer (EVA), ethylene-ethyl acrylate copolymer, ethylene-methyl acrylate copolymer, ethylene-glycidyl methacrylate copolymer, ethylene-butene copolymer, ethylene-butene-hexene terpolymer, ethylene-propylene-diene terpolymer (EPDM), ethylene-octene copolymer (EOR), ethylene-propylene copolymer (EPR), ethylene-styrene copolymer, styrene-butadiene copolymer, a substance derived from these materials modified with acid such as maleic acid, etc., can be used. One type of the polyolefin resins may be singularly used, or two or more types may be used in combination.

The resin component used for the semiconductive resin composition preferably includes, for example, EVA. The EVA is preferable because the conductive agent is easily added due to a large filler acceptability and because the flame-retardant property of the EVA itself is to some extent level. A "VA amount" of the EVA is preferably, for example, equal to or larger than 15% from the viewpoint of the filler acceptability, and is preferably, equal to or smaller than 80% from the viewpoint of the manufacturability such as adhesion.

As the conductive agent used for the semiconductive resin composition, for example, carbon black, carbon nanotube, etc., are cited, and, for example, the carbon black can be preferably used. As the carbon black, for example, furnace black, channel black, acetylene black, and thermal black, etc., can be used, and the acetylene black can be preferably used because high conductivity is provided with a small amount. A single type of the conductive agents may be used, or two or more types may be used in combination. Further, as the conductive agent, other additives or fillers may be used. Although optional, an additive such as magnesium hydroxide having the flame-retardant property may be used as the conductive agent in order to provide the flame-retardant property to the semiconductive layer 20, so that the semiconductive layer 20 can be functioned as the flame-retardant semiconductive layer.

A mixing amount of the conductive agent is not particularly limited as long as the volume resistivity of the semiconductive resin composition making up the semiconductive layer 20 is equal to or smaller than $1.0 \times 10^{15}$ (Ωcm). For example, a mixing amount in a case of the carbon black per 100 parts by mass of the resin component is equal to or larger than 30 parts by mass, and a mixing amount in a case of the magnesium hydroxide is equal to or larger than 150 parts by mass. Note that it is preferable to, for example, avoid the excess mixing amount of the conductive agent because of a risk of decrease in the mechanical characteristics of the semiconductive layer 20, which results in decrease in elongation. For example, the mixing amount in the case of the carbon black per 100 parts by mass of a base polymer is preferably equal to or smaller than 150 parts by mass, and the mixing amount in the case of the magnesium hydroxide is preferably equal to or smaller than 250 parts by mass.

The semiconductive layer 20 is preferably made of a cross-linked semiconductive resin composition in order to improve heat resistance. As a cross-linking method, irradiation cross-linking, chemical cross-linking, silane cross-linking, etc., can be cited. In order to perform the favorable cross-linking process, the semiconductive resin composition may contain a cross-linking agent or a cross-linking promoter. The semiconductive resin composition may contain other fillers such as additives such as a flame retardant, an antioxidant, a copper inhibitor, a reinforcing agent, and a process oil so as not to lose the characteristics of the semiconductive layer 20 if needed.

(Insulating Layer)

The insulating layer 22 contains the resin component, and is preferably made of an insulating resin composition whose volume resistivity is larger than $5.0 \times 10^{15}$ (Ωcm) to be configured so that a water absorption amount and a water diffusion coefficient are small. The insulating layer 22 has a high water impervious property so that water is difficult to infiltrate therein, and therefore, the water infiltration into the semiconductive layer 20 located inside the coating layer can be suppressed. Although the insulating layer 22 practically does not contain the flame-retardant agent and has therefore a low flame-retardant property, the insulating layer 22 is covered with the flame-retardant semiconductive layer 24 described later.

A material making up the insulating layer 22 may be a material whose volume resistivity is equal to or larger than $5.0 \times 10^{15}$ (Ωcm), and there is no particular upper limit in the volume resistivity. When the volume resistivity is smaller than $5.0 \times 10^{15}$ (Ωcm), the volume resistivity of the insulating layer 22 and the flame-retardant semiconductive layer 24 are almost the same as each other, and therefore, the voltage is shard onto the flame-retardant semiconductive layer side, and it is required to thicken the insulating layer 22. Because of the thick insulating layer 22, it is also adversely required to thicken the flame-retardant semiconductive layer 24 since the insulating layer 22 is made of the combustible material, and therefore, the achievement of the diameter reduction is difficult.

From the viewpoint of ensuring the forming workability of the insulating layer 22, a resin is preferable as the resin component making up the insulating layer 22, and the same resin as that of the semiconductive layer 20 can be used. Polyolefin is more preferable for the insulating layer 22. Particularly, polyethylene is desirable because of a high electrical insulation property (volume resistivity), a low moisture absorption rate, favorable formability, and relatively large breaking elongation, and the high-density polyethylene and/or low-density polyethylene can be used. Further, linear low-density polyethylene (LLDPE) is particularly preferable because of other excellent properties such as high oil resistance (solvent resistance) and inexpensiveness.

When the insulating layer 22 is made of such a resin as LLDPE, for example, an insulating resin composition containing LLDPE may be formed by its extrusion molding to the outer periphery of the semiconductive layer 20. From the viewpoint of further improving the insulation property of the insulating layer 22, it is preferable to form the insulating layer 22 from a cross-linked substance by addition and cross-linking of a cross-linking agent, a cross-linking promoter, etc., to/with the insulating resin composition. Because of the cross-linkage, a molecular structure of the resin becomes rigid, so that the water impervious property of the insulating layer 22 can be improved. Besides, the strength of the insulating layer 22 can be also improved. Therefore, even if the insulating layer 22 is thinned, the high insulation property can be kept without losing the strength. The insulating layer 22 is preferably made of a non-halogen resin composition.

Preferably, it is better not to add the additives such as talc and magnesium hydroxide because such an additive tends to decrease the volume resistivity. However, if the volume resistivity does not significantly decrease, such an additive can be added to the insulating resin composition.

The insulating layer 22 can contain the additive whose amount is equal to or smaller than 5 parts by mass per 100 parts by mass of the resin component. The insulating layer 22 contains preferably the additive being equal to or smaller than 3 parts by mass, and more preferably the additive being equal to or smaller than 1.5 parts by mass.

Here, the additive means an additive such as cross-linking agent, cross-linking promoter, copper inhibitor, flame retardant, flame retardant promoter, plasticizer, filler, metal chelator, softener, reinforcing agent, surfactant, stabilizer, ultraviolet absorber, light stabilizer, lubricant, antioxidant, colorant (e.g., carbon black), processing modifier, inorganic filler, compatibilizer, foaming agent, and antistatic agent.

It is preferable to cross-link the cross-linked substance making up the insulating layer 22 so that its gel fraction is equal to or larger than 40% and equal to or smaller than 100%. The strength and the insulation property of the insulating layer 22 can be increased by the high gel fraction of the cross-linked substance, and therefore, the thickness of the insulating layer 22 can be further thinned.

For the case of the cross-linking of the insulating layer 22, it is better to mix a publicly-known cross-linking agent or cross-linking promoter to the insulating resin composition. As the cross-linking agent, for example, organic peroxide, a silane coupling agent, etc., can be used. As the cross-linking promoter, for example, a polyfunctional monomer such as triallyl isocyanurate and trimethylol propane triacrylate can be used. Such a material is not limited in a mixture amount. For example, the mixture amount may be changed properly so that a degree of the cross-linking of the cross-linked substance making up the insulating layer 22 in terms of the gel fraction is equal to or larger than 40% and equal to or smaller than 100%. As the cross-linking method, a publicly-known method such as chemical cross-linking and electron beam cross-linking is applicable in accordance with a type of the cross-linking agent.

(Flame-Retardant Semiconductive Layer)

The flame-retardant semiconductive layer 24 is formed by, for example, extrusion of a flame-retardant resin composition containing a flame retardant to the outer periphery of the insulating layer 22 so that the oxygen index defined by JIS K7201-2 is larger than 40 as similar to the semiconductive layer 20.

The flame-retardant semiconductive layer 24 is formed by, for example, extrusion of a flame-retardant resin composition containing a flame retardant to the outer periphery of the conductor 11 so that the oxygen index is larger than 40 and the volume resistivity is equal to or smaller than $1.5 \times 10^{15}$ (Ωcm). The flame-retardant semiconductive layer 24 is arranged on the outermost layer, and therefore, protects the inner insulating layer 22 and semiconductive layer 20 from the flame, and besides, also functions as the electric field moderating layer to moderate the electric field concentration onto the insulating layer, so that the insulation property is further improved. This layer is preferably made of a non-halogen flame-retardant resin composition in consideration of the safety at the time of fire and the volume resistivity.

The flame-retardant semiconductive layer 24 may be cross-linked as similar to the semiconductive layer 20. For example, the cross-linking of the flame-retardant semiconductive layer 24 may be performed after a cross-linking agent or a cross-linking promoter is added to the flame-retardant resin composition making up the flame-retardant semiconductive layer 24, and then, the resin composition is extruded and formed. A cross-linking method is not particularly limited, and the cross-linking may be performed by a related-art publicly-known cross-linking method such as irradiation with electron beams.

(Stacked Structure of Coating Layer)

Subsequently, a stacked structure of the coating layer (the semiconductive layer 20, the insulating layer 22, and the flame-retardant semiconductive layer 24) will be described. In the coating layer, the thickness of the insulating layer 22 is not particularly limited, and the thinner insulating layer 22 that is made of the combustible material is better from the viewpoint of the flame-retardant property. However, when it is too thin, the insulation property decreases because of occurrence of a pinhole and the surface irregularity at the time of a forming process, etc., and therefore, the thickness is preferably equal to or larger than 0.05 mm. Meanwhile, an upper limit of the thickness of the insulating layer 22 is not particularly limited. However, from the viewpoint of the flame-retardant property of the insulated wire 1, the thickness is preferably equal to or smaller than 0.10 mm.

In the coating layer, each thickness of the semiconductive layer 20 and the flame-retardant semiconductive layer 24 is not particularly limited, and may be properly changed in accordance with the flame-retardant property and the direct-current stability required for the coating layer. From the viewpoint of obtaining the high flame-retardant property, it is preferable to form the semiconductive layer 20 and the flame-retardant semiconductive layer 24 so that a total thickness of these layers is equal to or larger than 0.35 mm.

The semiconductive layer 20 contributes to the direct-current stability of the coating layer. Therefore, from the viewpoint of obtaining the desirable direct-current stability, the thickness of the semiconductive layer 20 is preferably at least 0.5 or more times a wire diameter of the metal wire making up the conductor 11, or preferably equal to or larger than 0.10 mm if the wire diameter is equal to or smaller than 0.2 mm. Meanwhile, its upper limit is not particularly limited, and can be properly changed in consideration of the flame-retardant property of the coating layer and the diameter reduction in the insulated wire 1. And, the semiconductive layer 20 is preferably formed on the outer periphery of the conductor 11.

In order to cover the insulating layer 22 to suppress its burning, the thickness of the flame-retardant semiconductive layer 24 is preferably at least equal to or larger than 0.25 mm. Meanwhile, its upper limit is not particularly limited, and can be properly changed in consideration of the flame-retardant property of the coating layer and the diameter reduction in the insulated wire 1.

When there is a different insulating layer other than the semiconductive layer 20, the insulating layer 22, and the flame-retardant semiconductive layer 24, "the thickness of the coating layer" described here means the thickness of the entire coating layer also including the different insulating layer.

The coating layer shown in FIG. 1 according to the embodiment of the present invention is formed of three layers. Meanwhile, the three layers may have a multi-layered structure in which a plurality of the semiconductive layers 20 may be formed on an outer periphery of the conductor 11, a plurality of the insulating layers 22 may be formed on an outer periphery of the semiconductive layer 20, and a plurality of the flame-retardant semiconductive layers 24 may be formed on an outer periphery of the insulating layer 22.

It is only required to form the semiconductive layer 20 on the outer periphery of the conductor 11, the flame-retardant semiconductive layer 24 as the outermost layer, and the insulating layer 22 between these two layers. There is no problem of existence of a different resin composition layer between the semiconductive layer 20 and the insulating layer 22 and between the insulating layer 22 and the flame-retardant semiconductive layer 24. For example, such a layer as providing other characteristics such as an adhesive layer may be arranged between the layers.

Figure 2:
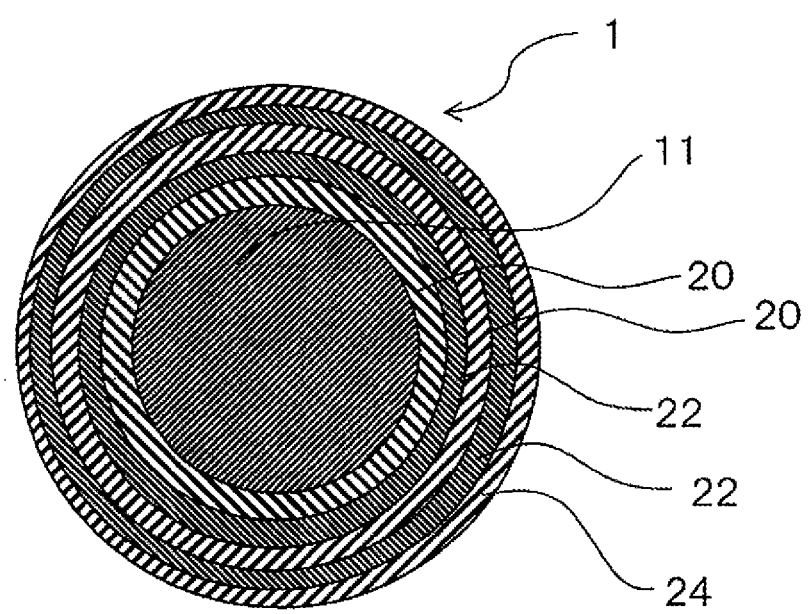
FIG. 2 is a horizontal cross-sectional view showing another embodiment of an insulated wire of the present invention.

As shown in FIG. 2, a plurality of the semiconductive layers 20 and a plurality of the insulating layers 22 may be provided so as to form a five-layer structure in which the insulating layers are interposed among the semiconductive layer 20, the semiconductive layer 20, and the flame-retardant semiconductive layer 24.

Note that the insulated wire of the present embodiment is not particularly limited in its application. However, the insulated wire can be used as, for example, a power system wire (an insulated wire in conformity to Power & Control Cables described in EN 50264-3-1 (2008)).

PRACTICAL EXAMPLES

Next, the present invention will be further described in detail on the basis of practical examples. However, the present invention is not limited by these practical examples.

<Materials Used in Practical Examples and Comparative Examples>

Ethylene-vinyl acetate (EVA) copolymer: "EvaFlex EV170" produced by Du Pont-Mitsui Polychemicals Co., Ltd.

Maleic acid modified polymer: "TAFMAR MH7020" produced by Mitsui Chemicals, Inc.

Thermoplastic polyimide: "AURUM PL450C" produced by Mitsui Chemicals, Inc.

Silicone modified polyetherimide: "STM1500" produced by SABIC Corporation

Linear low-density polyethylene (LLDPE): "EVOLUE SP2030" produced by Prime Polymer Co., Ltd.

Flame retardant (magnesium hydroxide): "KISUMA 5A" produced by Kyowa Chemical Industry Co., Ltd.

Mixed-system antioxidant: "Adekastab AO-18" produced by ADEKA Corporation

Phenolic-system antioxidant: "Irganox1010" produced by BASF SE Corporation

Carbon black: "ASAHI THERMAL" produced by Asahi Carbon Co., Ltd.

Lubricant (zinc stearate): Nitto Kasei Co., Ltd.

Cross-linking promoter (trimethylol propane triacrylate (TMPT)): produced by Shin Nakamura Chemical Co., Ltd.

Conductive agent (magnesium hydroxide): "KISUMA 5A" produced by Kyowa Chemical Industry Co., Ltd.

<Preparation of Semiconductive Resin Composition>

In order to form the semiconductive layer, the semiconductive resin composition was prepared. Specifically, 75 parts by mass of the EVA, 25 parts by mass of the maleic acid modified polymer, 150 parts by mass of the magnesium hydroxide, 2 parts by mass of the cross-linking promoter, 2 parts by mass of the mixed-system antioxidant, 8 parts by mass of the carbon black, and 1 parts by mass of the lubricant were mixed together, and the mixture was kneaded by using a 75-L pressure kneader. After the kneading, the kneaded mixture was extruded by using an extruder to form a strand, and was cooled in water and cut, so that a pellet semiconductive resin composition was obtained. This pellet had a cylindrical shape having a diameter of about 3 mm and a height of about 5 mm. Note that the volume resistivity was $2.19 \times 10^{14}$ ($\Omega$cm).

<Preparation of Insulating Resin Composition>

Subsequently, in order to form the insulating layer, the insulating resin composition was prepared. Specifically, 100 parts by mass of the LLDPE and 1 part by mass of the phenolic-system antioxidant were dry-blended and kneaded together by using a pressure kneader, so that the insulating resin composition was prepared. Note that the volume resistivity was $1.84 \times 10^{17}$ (Ωcm).

<Preparation of Flame-Retardant Resin Composition>

In order to form the flame-retardant semiconductive layer, the flame-retardant semiconductive resin composition was prepared. Specifically, first, 75 parts by mass of the EVA, 25 parts by mass of the maleic acid modified polymer, 200 parts by mass of the magnesium hydroxide, 2 parts by mass of the cross-linking promoter, 2 parts by mass of the mixed-system antioxidant, 2 parts by mass of the carbon black, and 1 part by mass of the lubricant were mixed together, and the mixture was kneaded by using a 75-L pressure kneader. After the kneading, the kneaded mixture was extruded by using an extruder to form a strand, and was cooled in water and cut, so that a pellet flame-retardant semiconductive resin composition was obtained. This pellet had a cylindrical shape having a diameter of about 3 mm and a height of about 5 mm. Note that the oxygen index was 45.5 and the volume resistivity was $7.8 \times 10^{14}$ (Ωcm).

<Production of Insulated Wire>

First Practical Example

The insulated wire 1 was produced by using the above-described semiconductive resin composition, insulating resin composition and flame-retardant semiconductive resin composition. Specifically, the insulated wire of a first practical example was produced by three-layer co-extrusion of the semiconductive resin composition, the insulating resin composition and the flame-retardant semiconductive resin composition each of which has a predetermined thickness onto an outer periphery of a tin-plated copper conductor wire having an outer diameter of 1.25 mm, and then, by cross-linking of each component with such irradiation with electron beam as causing an absorbed dose of 75 kGy. In the produced insulated wire, the inner semiconductive layer having the thickness of 0.10 mm, the insulating layer having the thickness of 0.11 mm, and the outer flame-retardant layer having the thickness of 0.29 mm were formed in this order from the conductor side, the thickness of the coating layer was 0.50 mm, and the wire outer diameter was 2.25 mm.

The produced insulated wire was evaluated in the mechanical strength, the direct-current stability, the flame-retardant property and the diameter reduction under the following method.

<Characteristic Evaluation>

(Mechanical Strength)

For the mechanical strength, the elongation under the tensile test was evaluated on the basis of EN50264, 60811-1-2. Specifically, the tensile test with a tension rate of 200 m/min was executed to a cylindrical sample that was obtained by pulling out the conductor from the insulated wire. When the breaking elongation was equal to or larger than 150%, its result was evaluated as "◯". When the breaking elongation was smaller than 150%, its result was evaluated as "X".

(Direct-Current Stability)

The direct-current stability was evaluated under the direct-current stability test in conformity to EN50305.6.7. Specifically, after the insulated wire was immersed in a 3% NaCl aqueous solution at 85° C. and applied with a voltage of 1500 V, when the electrical breakdown did not occur even after the elapse of 240 hours or longer, its result was evaluated as "pass (◯)" indicating excellent electrical characteristics. When the electrical breakdown did not occur even after the elapse of 480 hours or longer, its result was evaluated as "pass (⊚)" indicating extremely excellent electrical characteristics. When the electrical breakdown occurred within less than the elapse of 240 hours, its result was evaluated as "fail (X)".

(Flame-Retardant Property)

For the flame-retardant property, the vertical tray flame test (VTFT) was executed on the basis of EN50266-2-4. Specifically, seven electrical wires each having an entire length of 3.5 m were stranded to produce one bunch stranded wire, eleven bunch wires were vertically arranged with equal intervals and were burned for 20 minutes, and then, were self-extinguished. Then, its char length was targeted to be equal to or shorter than 2.5 m from the lower end. When the char length was equal to or shorter than 2.5 m, its result was evaluated as "pass (◯)". When the char length was longer than 2.5 m, its result was evaluated as "fail (X)".

As each thickness of the semiconductive layer, the insulating layer, and the flame-retardant semiconductive layer, an average obtained by separating a sample having a length of 1 m into 10 segments and observing and measuring each cross section of these segments by using a microscope was employed.

The three-layer co-extrusion was executed by using three single-screw extruders and combining the resin compositions in a crosshead.

(Diameter Reduction)

In comparison with data of Conductor diameter and Mean thickness of insulation shown in "Table 1"-"General data"-"Cable type 0.6/1 kV unsheathed" in EN50264-3-1 (2008), when the thickness of the coating layer was larger than the outer diameter of the conductor, its result was evaluated as "fail (X)". When the thickness of the coating layer was smaller than the outer diameter of the conductor, its result was evaluated as "pass (◯)".

Second Practical Example

In a second practical example, the insulated wire was produced as similar to that of the first practical example except that the volume resistivity was decreased by adding talc to the insulating resin composition of the insulating layer.

Results of the above-described first and second practical examples are shown in a table 1.

TABLE 1

| | | First practical example | Second practical example |
| --- | --- | --- | --- |
| Semiconductive layer | Volume resistivity (Ωcm) | $2.19 \times 10^{14}$ | $7.80 \times 10^{14}$ |
| Insulating layer | Volume resistivity (Ωcm) | $1.84 \times 10^{17}$ | $1.60 \times 10^{16}$ |
| Flame-retardant semiconductive layer | Volume resistivity (Ωcm) | $7.80 \times 10^{14}$ | $7.80 \times 10^{14}$ |
| Oxygen index of flame-retardant semiconductive layer | | 45.5 | 45.5 |
| Characteristic evaluation result | Mechanical strength | ◯ | ◯ |
| | Direct-current stability | ⊚ | ◯ |
| | Flame-retardant property | ◯ | ◯ |
| | Diameter reduction | ◯ | ◯ |

First and Second Practical Examples

The first and second practical examples passed (◯ or ◉) in the mechanical strength, the direct-current stability, the flame-retardant property and the diameter reduction.

While the outer diameter of the conductor was 1.25 mm and the thickness of the coating layer was 0.50 mm in the first and second practical examples, the outer diameter of the conductor was 1.25 mm and the thickness of the coating layer was 0.6 mm in Table 1 of EN50264-3-1 described above. Therefore, in comparison between both thicknesses of the coating layers, the first and second practical examples passed (◯) in the diameter reduction because the thickness of the coating layer was smaller than the outer diameter of the conductor. Results of first to fourth comparative examples are shown in a table 2.

TABLE 2

|  |  | First comparative example | Second comparative example |
|---|---|---|---|
| Semiconductive layer | Volume resistivity (Ωcm) | $1.60 \times 10^{16}$ | $2.19 \times 10^{14}$ |
| Insulating layer | Volume resistivity (Ωcm) | $1.60 \times 10^{16}$ | $1.84 \times 10^{17}$ |
| Flame-retardant semiconductive layer | Volume resistivity (Ωcm) | $7.80 \times 10^{14}$ | $1.60 \times 10^{16}$ |
| Oxygen index of flame-retardant semiconductive layer |  | 45.5 | 23.1 |
| Characteristic evaluation result | Mechanical strength | ◯ | ◯ |
|  | Direct-current stability | X | X |
|  | Flame-retardant property | ◯ | X |
|  | Diameter reduction | ◯ | ◯ |

|  |  | Third comparative example | Fourth comparative example |
|---|---|---|---|
| Semiconductive layer | Volume resistivity (Ωcm) | $2.19 \times 10^{14}$ | — |
| Insulating layer | Volume resistivity (Ωcm) | $1.84 \times 10^{17}$ | $1.84 \times 10^{17}$ |
| Flame-retardant semiconductive layer | Volume resistivity (Ωcm) | — | $7.80 \times 10^{14}$ |
| Oxygen index of flame-retardant semiconductive layer |  | — | 45.5 |
| Characteristic evaluation result | Mechanical strength | X | X |
|  | Direct-current stability | X | X |
|  | Flame-retardant property | X | ◯ |
|  | Diameter reduction | ◯ | ◯ |

First Comparative Example

In a first comparative example, a multi-layer insulated wire having the same structure as that of the first practical example except that the volume resistivity of the semiconductive resin composition of the first practical example was $1.60 \times 10^{16}$ (Ωcm) was produced and evaluated in the mechanical strength, the direct-current stability, and the flame-retardant property under the same method. In results, the first comparative example passed (◯) in the mechanical strength, the flame-retardant property and the diameter reduction. However, it failed (X) in the direct-current stability. This is because the volume resistivity of the semiconductive layer was high, and therefore, the electric field concentration due to the surface irregularity on the conductor could not be moderated.

Second Comparative Example

In a second comparative example, an insulated wire having the same structure as that of the first practical example but except that the volume resistivity of the flame-retardant semiconductive resin composition of the first practical example was $1.60 \times 10^{16}$ (Ωcm) and except that the oxygen index was 23.1 was produced and evaluated in the mechanical strength, the direct-current stability, the flame-retardant property and the diameter reduction under the same method.

In results, the second comparative example passed (◯) in the mechanical strength and the diameter reduction. However, it failed (X) in the direct-current stability and the flame-retardant property. It is considered that a reason why it failed (X) in the direct-current stability is that the volume resistivity of the flame-retardant semiconductive layer was high, and therefore, the electric field concentration due to the surface irregularity on the flame-retardant semiconductive layer could not be moderated. And, it is considered that a reason why it failed (X) in the flame-retardant property is that the flame-retardant property that is large enough to protect the insulating layer made of the combustible material could not be ensured because of the low oxygen index.

Third Comparative Example

In a third comparative example, an insulated wire as similar to the first practical example except that the flame-retardant semiconductive layer is absent was produced. And, it was evaluated in the mechanical strength, the direct-current stability, the flame-retardant property and the diameter reduction under the same method. In results, the third comparative example failed (X) in the mechanical strength, the direct-current stability and the flame-retardant property. It is considered that a reason why it failed (X) in the mechanical strength is that the strength was decreased because of the absence of the flame-retardant semiconductive layer. It is considered that a reason why it failed (X) in the direct-current stability is that the electric field concentration due to the surface irregularity of the insulating layer occurred, and it is considered that a reason why it failed (X) in the flame-retardant property is that the layer for protecting the insulating layer made of the combustible material from the flame was absent.

Fourth Comparative Example

In a fourth comparative example, an insulated wire as similar to the first practical example except that the semiconductive layer of the first practical example is absent was produced. The sample was produced and evaluated in the mechanical strength, the direct-current stability, the flame-retardant property and the diameter reduction under the same method. In results, the fourth comparative example passed (◯) in the flame-retardant property but failed (X) in the mechanical strength and the direct-current stability. It is considered that a reason why it failed (X) in the mechanical strength is that the strength was decreased because of the absence of the semiconductive layer, and it is considered that a reason why it failed (X) in the direct-current stability is that the electric field concentration due to the surface irregularity of the conductor occurred.

What is claimed is:

1. An insulated wire comprising:
a conductor; and
a coating layer arranged on an outer periphery of the conductor,
wherein the coating layer includes:
a semiconductive layer arranged immediately on the conductor, the semiconductive layer having a volume resistivity defined by JIS C2151 that is equal to or smaller than $1.0 \times 10^{15}$ ($\Omega$cm), and containing a resin component and a conductive agent;
an insulating layer arranged on an outer periphery of the semiconductive layer, the insulating layer having a volume resistivity defined by JIS C2151 that is larger than $5.0 \times 10^{15}$ ($\Omega$cm); and
a flame-retardant semiconductive layer arranged on an outer periphery of the insulating layer, the flame-retardant semiconductive layer having a volume resistivity defined by JIS C2151 that is equal to or smaller than $1.5 \times 10^{15}$ ($\Omega$cm) and an oxygen index defined by JIS K7201-2 that is larger than 40,
a diameter of the conductor is equal to or smaller than 1.25 mm, and a thickness of the coating layer is smaller than 0.6 mm,
a content of the conductive agent is equal to or more than 150 parts by mass and equal to or less than 250 parts by mass per 100 parts by mass of the resin component, and
the flame-retardant semiconductive layer is the outermost layer.

2. The insulated wire according to claim 1,
wherein the insulated wire has a flame-retardant property that allows the insulated wire to pass a vertical tray flame test (VTFT) on the basis of EN 50266-2-4.

3. The insulated wire according to claim 1,
wherein the insulated wire has a direct-current stability that allows the insulated wire to pass a direct-current stability test in conformity to EN 50305.6.7.

4. The insulated wire according to claim 1,
wherein breaking elongation of the coating layer measured in a tensile test with a tension rate of 200 m/min is equal to or larger than 150%.

5. The insulated wire according to claim 1,
wherein a flame-retardant resin composition making up the flame-retardant semiconductive layer includes at least one resin selected from a group consisting of high-density polyethylene, linear low-density polyethylene, low-density polyethylene, ethylene-($\alpha$-olefin) copolymer, ethylene-vinyl acetate copolymer, ethylene-acrylic acid ester copolymer, and ethylene-propylene-diene copolymer.

6. The insulated wire according to claim 1,
wherein a flame-retardant semiconductive resin composition making up the flame-retardant semiconductive layer contains a resin component and a flame retardant so that 150 or more and 250 or less parts by mass of the flame retardant per 100 parts by mass of the resin component is contained.

7. The insulated wire according to claim 1,
wherein an insulating resin composition making up the insulating layer contains a resin component so that the resin component is made of high-density polyethylene and/or low-density polyethylene.

8. The insulated wire according to claim 1, further comprising:
an additional semiconductive layer arranged on the outer periphery of the insulating layer; and
an additional insulating layer arranged on an outer periphery of the additional semiconductive layer.

9. The insulated wire according to claim 1,
wherein the flame-retardant semiconductive layer has a thickness of 0.25 mm or more.

10. The insulated wire according to claim 1,
wherein the semiconductive layer comprises a cross-linked semiconductive resin composition.

11. The insulated wire according to claim 1,
wherein the insulating layer comprises a non-halogen resin composition.

* * * * *